United States Patent
Viaud

(10) Patent No.: US 7,918,158 B2
(45) Date of Patent: Apr. 5, 2011

(54) BALER WITH AUTOMATIC SENSOR CALIBRATION

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 9 days.

(21) Appl. No.: 12/194,659

(22) Filed: Aug. 20, 2008

(65) Prior Publication Data
US 2009/0049817 A1 Feb. 26, 2009

(30) Foreign Application Priority Data
Aug. 22, 2007 (EP) .................................... 0711474

(51) Int. Cl.
*B30B 15/26* (2006.01)
*A01D 39/00* (2006.01)
(52) U.S. Cl. ............. 100/45; 100/88; 56/10.2 R; 56/341
(58) Field of Classification Search ................... 100/45, 100/49, 76, 78, 88, 89, 99; 56/341, 344, 56/10.2 R
See application file for complete search history.

(56) References Cited

U.S. PATENT DOCUMENTS

| 4,224,867 A * | 9/1980 | Gaeddert et al. ............... 100/88 |
| 4,433,533 A | 2/1984 | Giani |
| 4,517,795 A * | 5/1985 | Meiers ........................... 56/341 |
| 4,702,066 A | 10/1987 | Newendorp et al. |
| 4,850,271 A * | 7/1989 | White et al. .................... 100/88 |
| 4,855,924 A | 8/1989 | Strosser et al. |
| 5,444,969 A * | 8/1995 | Wagstaff et al. ................ 56/341 |
| 5,551,218 A * | 9/1996 | Henderson et al. ............ 53/504 |
| 5,615,544 A * | 4/1997 | Berger et al. ................... 56/341 |
| H1819 H * | 12/1999 | Anderson et al. ............... 56/341 |
| 6,874,412 B1* | 4/2005 | Glaszcz et al. ................. 100/47 |
| 2006/0048654 A1* | 3/2006 | Biziorek ........................ 100/87 |
| 2007/0175198 A1* | 8/2007 | Viaud et al. .................... 56/341 |
| 2008/0148703 A1* | 6/2008 | Smith et al. .................... 56/341 |

FOREIGN PATENT DOCUMENTS

| EP | 0634094 | 11/1994 |
| EP | 1593299 | 5/2005 |
| EP | 1634491 | 7/2005 |
| EP | 1685759 | 10/2005 |
| EP | 1813146 | 1/2007 |
| FR | 2579063 | 3/1985 |

OTHER PUBLICATIONS

US H1819, US Statutory Invention Registration, dated Dec. 7, 1999, 14 Pages.

* cited by examiner

*Primary Examiner* — Jimmy T Nguyen

(57) ABSTRACT

A baler comprises a baling chamber and a sensor arrangement. The sensor arrangement comprises at least one sensor arranged to provide information about a mechanical property of a bale built in the baling chamber and a control unit receiving signals from the sensor. The control unit is operable to automatically calibrate the signals from the sensor based upon at least one signal from the sensor received in at least one known state of the sensor.

12 Claims, 2 Drawing Sheets

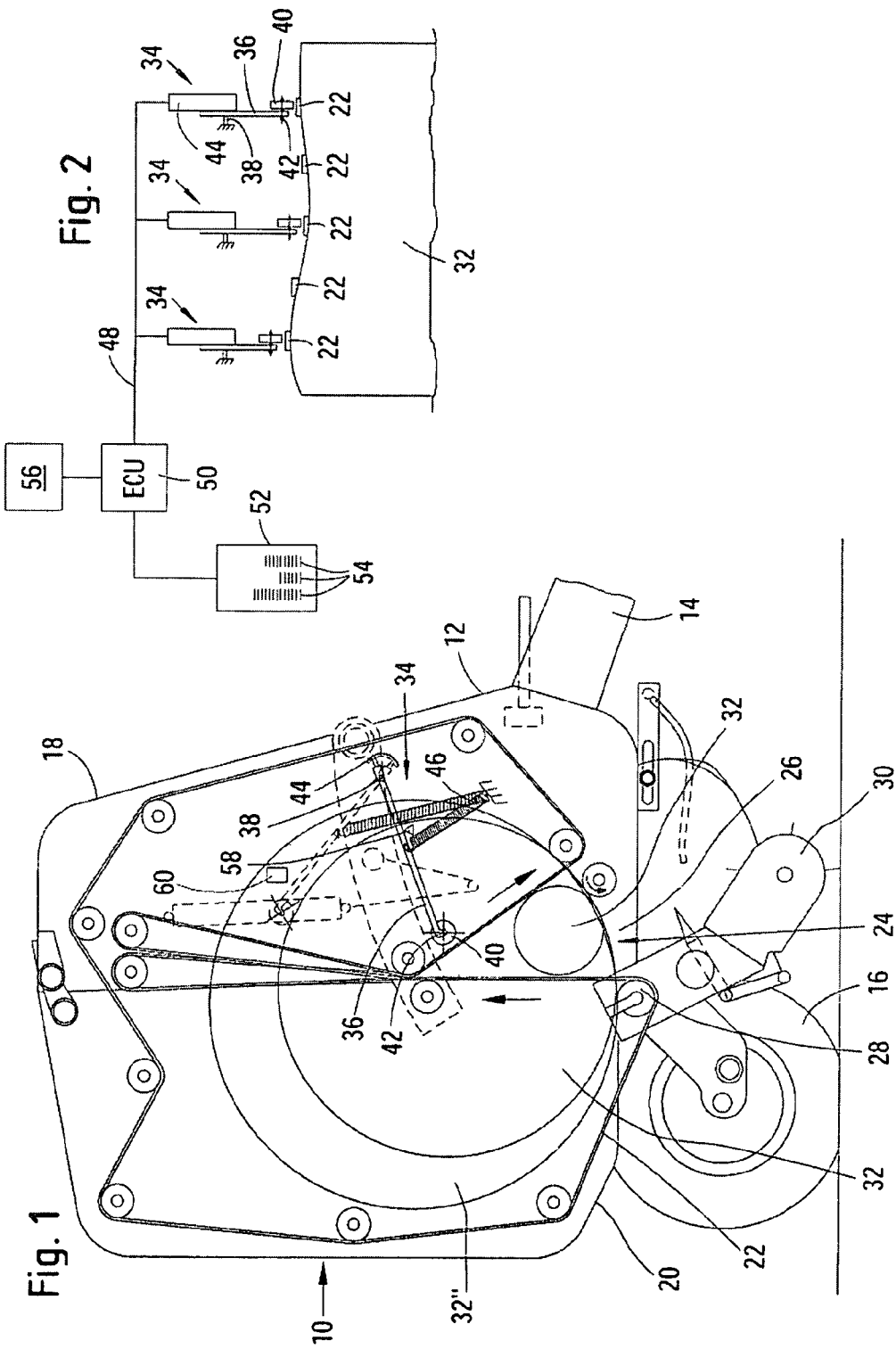

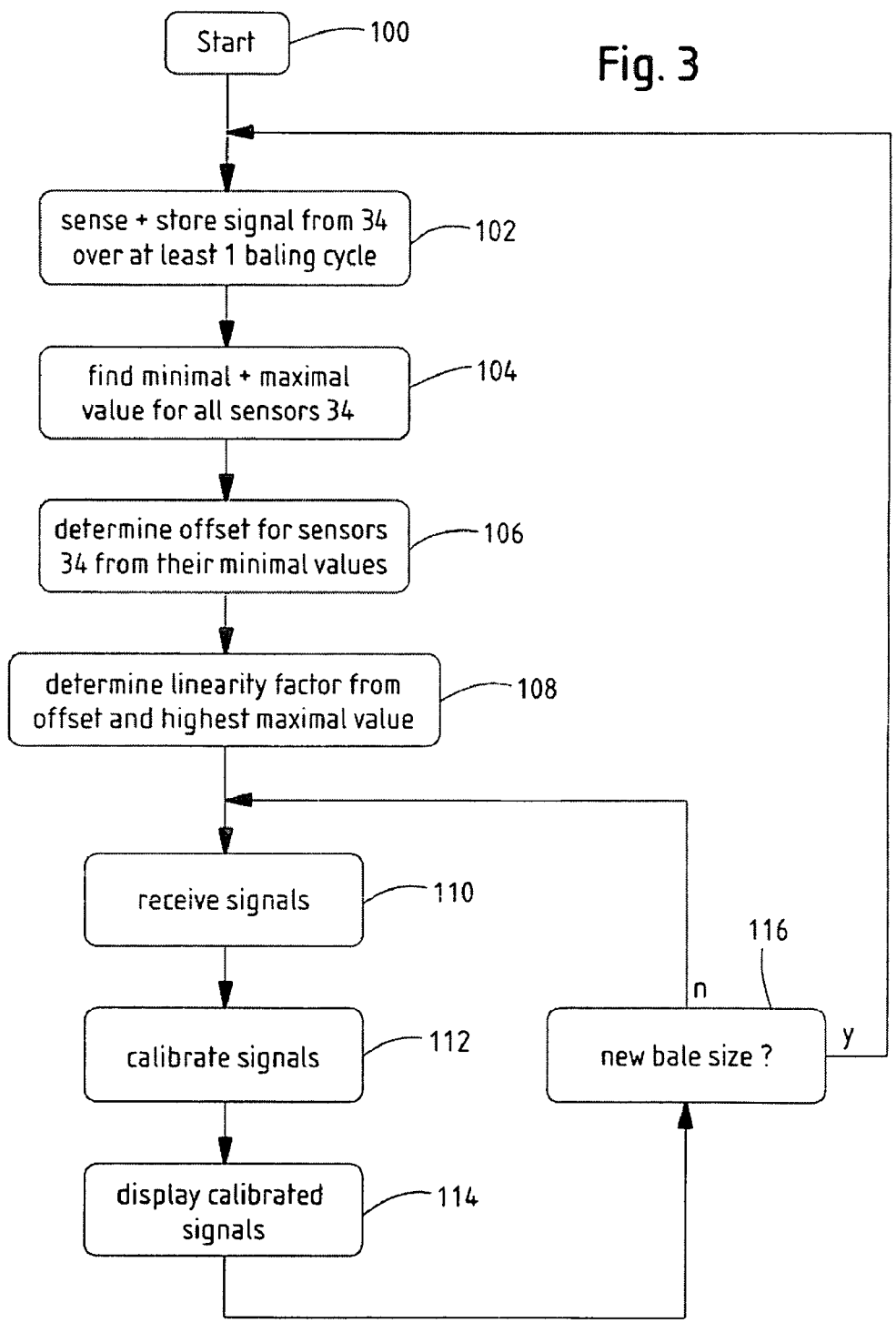

BALER WITH AUTOMATIC SENSOR CALIBRATION

FIELD OF THE DISCLOSURE

The disclosure relates to an agricultural baler comprising a baling chamber and a sensor arrangement with at least one sensor arranged to provide information about a mechanical property of a bale built in the baling chamber and a control unit receiving signals from the sensor.

BACKGROUND OF THE DISCLOSURE

A tractor/baler combination is used in agriculture to take up crop lying in a swath on a field with a pick-up and to press and bind the crop into a bale in a baling chamber. Due to different widths of the baling chamber and the swath, it is appropriate to steer the tractor in a manner such that the pick-up of the baler is not continuously centered over the swath, but moves over time successively to the left and to the right side of the swath, in order to produce a cylindrical bale. Thus, sensors for the shape or deformability of the bale have been proposed that provide steering information to steered wheels of the baler (U.S. Pat. No. 4,702,066 A) or pivoting the tongue of the baler (U.S. Pat. No. 4,433,533 A) to steer the baler laterally with respect to the tractor or giving a steering indication to the tractor operator (FR 2 579 063 A, U.S. Pat. No. 4,224,867 A, U.S. Pat. No. 4,855,924 A, EP 1 593 299 A) in a manner to drive on a sinusoidal path along the swath for obtaining a homogenous bale shape. It was also proposed to steer the tractor based upon a bale shape signal and a detection of a swath position (EP 1 634 491 A, EP 1 685 759 A, EP 1 813 146 A).

Mechanical arrangements for detecting the size or the symmetry of a bale produced in a rotary baler have been proposed in EP 1 685 759 A, U.S. Pat. No. 4,433,533 A and FR 2 579 063 A. These references disclose two feelers or rolls that interact with belts enclosing the baling chamber.

EP 0 634 094 A teaches that the compactness of the bale can be detected using a spring in contact with the side flanks of the bale.

EP 1 634 491 A describes a baler with three ultrasonic distance sensors distributed over the width of the baling chamber for detecting and displaying the bale diameter in three different positions.

US 1 819 H describes a baler shape monitor with three rollers sensing the bale diameter distributed over the width of the baling chamber. A switch is actuated and thus a signal is provided to the operator once the diameter of the bale in one of the end locations is less than the diameter at the intermediate location.

U.S. Pat. No. 4,850,271 A describes a rotary baler capable of measuring the diameter of the bale and displaying this information. The sensor assembly includes three sensors positioned along the width of the baling chamber, each of which detects the tension in the belts of the baling chamber by use of a spring-loaded mechanism actuating a potentiometer. The mechanism moves potentiometers that are connected to the display arrangement by means of a signal processor. An additional potentiometer detects the position of a tensioning arm of the belts. The information regarding the bale shape is thus derived from an indirect measurement of the belt tension.

A disadvantage of the above-described electro-mechanical sensors for sensing the bale diameter, comprising mechanical feelers coupled to potentiometers, is that the mechanical connection between the feeler and the potentiometer is subject to tolerances. In order to achieve a correct indication of the correct bale size and shape, a calibration or adjustment of the electro-mechanical sensors is thus necessary. This calibration is, in the prior art, performed mechanically during the assembly process of the baler or during service work, and comprises a calibration of an offset (indicating an empty baling chamber) and a slope (corresponding to a known bale size) for at least two sensors. The calibration is cumbersome and thus one can frequently find balers running with an improper calibration of the bale size sensors. A calibration is also useful when contactless sensors are used, like in EP 1 634 491 A, since the mounting location of the sensor in the baler can vary from baler to baler.

SUMMARY OF THE DISCLOSURE

It is thus an object of the present invention to provide a bale shape sensor that does not require a laborious calibration.

A baler is thus provided having a baling chamber. A sensor arrangement comprises at least one sensor for providing information about a mechanical property of a bale built in the baling chamber and a control unit receiving signals from the sensor. The control unit, during operation, automatically calibrates the signals from the sensor based upon at least one signal from the sensor that is or was received in at least one known state of the sensor. Here, calibrating means converting the sensor signal into a calibrated signal that is independent from mechanic and/or electric tolerances of the sensor and its mounting in the baler. Thus, the control unit can derive an offset and/or a conversion factor for the sensor during the known state of the sensor and later apply one or both of them to the sensor signal. After all, a correct measurement value is derived from the sensor signal, without any necessity of a mechanical calibration of the sensor.

Dispensing with a mechanical sensor calibration avoids calibration elements for the sensor, allows mounting the sensor in areas of the baler that can be difficult to access, and reduces work and time during assembly of the baler and subsequent service work.

The baler can be a rectangular baler or a rotary baler, the latter having a fixed or variable size.

The mechanical properties of the bale that the sensor detects can be, at a rotary baler, the diameter of a bale, or a measure of its shape or eccentricity (e.g. a difference between the diameters of the bale at different axial positions, as per se described in US 1 819 H or it can be measured at the pivotal support of the rear gate, how much the rear gate frame is twisting and opening on each side). At a rectangular baler, the sensor can detect the length of a bale. At both types of balers (rectangular and rotary, either with fixed or variable baling chamber size), the sensor can detect the deformability of hardness of the bale, preferably at both side flanks. It is also possible to use the sensor for sensing the tension in one or more conveying elements of a rotary baler with a baling chamber of variable size, wherein the conveying elements are surrounding the bale. This measurement is especially suited to obtain information on eccentricity by comparing the values of two sensors at different conveying elements.

The sensor can interact mechanically (like in U.S. Pat. No. 4,433,533 A) or in a contactless manner (like in EP 1 634 491 A) with the bale or an endless feeding element (belt or chain) surrounding the baling chamber.

The known state of the sensor can be derived from the signal of the sensor. For example, the control unit can assume that the baling chamber is empty—and thus the sensor is in its position corresponding to an empty baling chamber—when the sensor signal indicates, considering a sufficiently long time interval allowing building and ejecting of at least one bale, a lowest or minimum value. This minimum value allows deriving an offset that is subtracted later from the sensor value, such that the final output value of the control unit is exactly zero (or a predetermined value corresponding to the lowest possible sensor reading) when the baling chamber is empty. In another embodiment, information indicating an empty baling chamber can be derived from a control signal sent to an actuator for opening and closing a rear gate and/or from a sensor detecting the position of this gate, assuming that the baler is empty when an appropriate time has passed after the gate was opened. The empty baling chamber can also be assumed when a bale weighing device within the baling chamber indicates that there is no bale weight, or when a bale weighing device downstream the baling chamber indicates that there is a bale weight.

Analogously, the control unit can assume that the baling chamber is entirely filled—and thus the sensor is in its position corresponding to a completely filled baling chamber—when the sensor signal indicates, also considering a sufficiently long time allowing building (while driving on a sinusoidal path) and ejecting of at least one bale, a highest or maximum value. This maximum value allows deriving a conversion factor that is later multiplied with the sensor value, such that the final output value of the control unit is corresponding to a maximal value when the baling chamber is full.

In another embodiment, information about a full baling chamber can be derived from a control signal sent to an actuator for opening and closing a rear gate and/or from a sensor detecting the position of this gate, assuming that a bale is completed and the baling chamber is hence filled shortly before a gate was opened. A full baling chamber can also be defined by an oversize sensor that is commonly used on current balers to warn the operator that the bale has reached the maximum allowed diameter.

It should be noted that in the case of a variable size baler, the bale sizes can vary according to the operator's selection, such that at least the calibration of the linearity factor can be repeated, once a full baling cycle has been completed, after another bale size was selected. In the embodiment described insofar, the sensor arrangement does after calibration not necessarily give an absolute indication of the bale size, but only a relative indication, due to the mentioned normalization to the actual maximal bale size. In another possible embodiment, the control unit can receive information about the selected bale size, and multiply the relative bale size calculated as described above with the selected bale size to calculate the absolute bale size. Alternatively or additionally, the sensors are calibrated in a manner allowing output of absolute bale size information, or the raw, uncalibrated sensor data are used for obtaining information on the absolute bale size. The absolute bale size, determined in any described manner, can for example be used for controlling the baler (stopping the tractor, wrapping and ejecting the bale).

The sensor arrangement preferably comprises at least two sensors distributed over the width of the baling chamber, in order to derive information about the shape of the bale and preferably submit it to a display and/or an automatic steering device. Since the bales used for obtaining the calibration values could be non-cylindrical, it is preferred when the linearity factor derived from the sensor providing the larger or largest maximum value is subsequently used for both or all sensors distributed over the width of the baling chamber.

In one embodiment, the sensor is mechanically interacting with the bale and/or a conveying element abutting the bale. One or more stops can be provided against which the sensor can be held by the operator or a suitable actuator. The control unit can derive the calibration values from the sensor signals obtained when the sensor is abutting the stop or stops. These calibration values allow indication of absolute bale sizes.

BRIEF DESCRIPTION OF THE DRAWINGS

FIG. 1 shows a schematic side view of a rotary baler;

FIG. 2 shows a schematic view of the arrangement for measuring the diameter and the shape of the cylindrical bale that includes sensors, a control unit and a display arrangement; and, FIG. 3 is a flow chart of a program under which the control unit operates when bales are produced.

DESCRIPTION OF THE PREFERRED EMBODIMENT

Referring now to the drawings, FIG. 1 shows a rotary baler 10 with a housing 12 coupled to an agricultural tractor, not shown, by means of a towbar 14, in order to be towed across a field to the right, in a direction of operation. The baler 10 is supported on wheels 16 and the housing 12 is composed of a rigid front housing half 18 and a pivoted rear housing half 20, which are connected to each other via an upper joint. The housing 12 carries a multitude of rolls or rollers. Several endless conveying elements 22, extending alongside each other, are carried over the rolls. The conveying elements 22 largely surround a baling chamber 24, together with side walls of the housing 12. In this embodiment, the conveying elements 22 are configured as belts but may be otherwise configured, for example as chains. An inlet 26 is provided in the lower region of the baling chamber 24. The inlet 26 is bordered to the rear by a roll 28 and permits the entry of crop taken up by a pick-up 30 into the baling chamber 24.

The rotary baler 10 further includes several conveying elements 22 arranged alongside each other. During the harvesting operation, the conveying elements 22 are brought into motion and enclose a bale 32 being formed in the baling chamber 24 on the front, top and rear. As illustrated in FIG. 1, the reference numbers 32, 32' and 32" refer to bales of increasing diameter. The configuration and the operation of such a rotary baler are known. Reference is made to the disclosure of U.S. Pat. No. 6,745,681, which is herein incorporated by reference in its entirety.

Several sensors 34 are fastened to the rear portion of the upper end of the rear housing half 20. As shown in FIG. 2, three sensors 34 are arranged alongside each other across the width of the rotary baler 10. The outer sensors 34 interact with the conveying elements 22 on edge regions of the bale 32, while the center sensor 34 interacts with a conveying element 22 in the center of the bale 32. The sensors 34 are of a conventional mechanical arrangement and comprise a rod 36 that is pivotally supported at its upper, forward end around a transversely extending axis 38 on the housing 12. The lower end of rod 36 supports an idler roller 40 that freely rotates around an axis 42 extending parallel to axis 38. A spring 46 biases the rod 36 against the bale 32. However, when the baling chamber 24 is empty, the rods 36 abut on a lower stop 58. On the end of rod 36 opposite to the roller 40, a potentiometer 44 is mounted, having a wiper coupled to rod 36. The potentiometer 44 is preferably connected as a voltage divider with one end of the resistance pad connected to ground and the other end to a known voltage, for example +12 V, using the wiper as output. All sensors 34 are identical. Thus, when the bale 32 increases in diameter, roller 40 and rod 36 move counterclockwise around axis 38, and the wiper of the potentiometer 44 moves accordingly, such that the potentiometer 44 gives an indication of the bale 32 diameter. In this way the sensors 34 provide information regarding the diameter of the bale 32, as a function of the position of the sensor 34. In another embodiment, contactless sensors 34 can be used, as described in EP 1 634 491 A.

The sensors 34 are connected via assigned bus interfaces (not shown) digitizing the sensor signals to an electronic control unit (ECU) 50 by a bus connection 48. The control unit 50, in turn, controls a display arrangement 52 positioned in the operators cab of the agricultural tractor. The sensors 34, the control unit 50 and the display arrangement 52 are supplied with power and current from the on-board network and power source of an agricultural tractor towing the baler 10. Preferably the display arrangement 52 and the control unit 50 are components of a bus network system of the agricultural tractor. The three measurement values of the sensors 34 are displayed on the display arrangement 52 in three fields 54, each of which represents a region of the bale 32. The measured values may be provided in graphical as indicated in FIG. 2 or in numerical or in any other suitable form. By providing this information in this manner, the operator is informed regarding the actual diameter and the shape of the evolving bale 32 and is enabled to take action necessary to correct any deficiencies in the formation of the bale. Moreover, the control unit 50 can detect the average bale diameter and the concentricity or shape of the bale using the present information. In particular, the control unit 50 can determine whether the bale is convex (barrel-shaped) or concave (hourglass-shaped), and derive therefrom a steering information indicating appropriate steering corrections, in order to attain bales that are as cylindrical as possible. This steering information is provided by means of the display 52 to the operator or to an automatic steering arrangement of the tractor 56, as described in EP 1 813 146 A, the contents of which incorporated herein by reference.

Due to mechanical and electrical tolerances in the sensors 34, the outputs of sensors 34 are not necessarily indicating the correct, lowermost size value when there is no bale 32 in the baling chamber 24 (or the bale 32 is such small that the conveying elements 22 do not yet touch the idler roller 44), and their outputs do not need to rise by the same amount when the diameter of the bale 32 increases by the same amount. In the prior art, cumbersome mechanical calibrations are necessary to achieve a correct bale size indication when there is no bale in the baling chamber 34, and that the fields 54 indicate the same diameters when the bale is cylindrical. Further on, the bale size of rotary baler 10 is variable, such that for small bale sizes, the length of the fields 54 is not used in its entirety, making recognition of different bale sizes difficult for the operator.

To avoid these disadvantages, the control unit 50 is operable to automatically calibrate the signals from the sensors 34 based upon signals from the sensors 34 that were received in at least one known operating condition of the baler 10 in which the sensors 34 are also in a known state, according to the flow diagram shown in FIG. 3. After start in step 100, the signals from all three sensors 34 are stored over at least one baling cycle, i.e. formation and ejection of one bale 32. The signals from the sensors 34 are stored in predefined time intervals, for example all 1 s. During this time, the display 52 can be controlled by the control unit 50 using stored calibration values, for example those from the last baling operation or predefined default values. After step 102, the minimum and maximum values for the signals from all sensors 34 are identified. It is to be understood that the minimum values are measured when the baling chamber 24 is empty, while the maximum values are obtained when the baling chamber 24 is filled with a bale of a maximum size or a maximum desired size. Since the bale 32 built during the investigated baling cycle does not need to be cylindrical, but could be convex or concave, the bale diameter is considered as corresponding to the largest signal measured. Hence, assuming a linear relationship between the measured signal and the bale diameter, in step 106 for each sensor 34 an assigned offset is identified, which corresponds to the lowest value in the stored signals, and in step 108 an assigned linear conversion factor is determined for each sensor 34 based upon its offset and the highest maximum value of all sensors. It would also be possible to assume a non-linear relationship between the sensor signal and the bale diameter.

In a preferred embodiment, for each sensor 34 an offset $n_n$ for each sensor and a common steepness factor m is determined, in which:

$$m = 1/(V_{1h} - V_{0h}); \text{ and,}$$

$$n_n = -V_{0n} \cdot m,$$

wherein $V_{0n}$ is the lowest value in the stored signals for the nth sensor 34, $V_{0h}$ is the lowest value in the stored signals for the sensor 34 having the largest signal measured, and $V_{1h}$ is the highest maximum value of all sensors 34.

In the next step 110, signals from the sensors 34 are received, converted or calibrated in step 112 in a manner that the calibrated signal is zero or a minimum value when the bale diameter is zero or so small that the conveying elements 22 do not yet touch the rollers 40 and a maximum value (like 1 or 100%) when the bale diameter corresponds to the maximum diameter, and then displayed on display 114.

According to the preferred embodiment, the equation:

$$Y_n = mV_n + n_n$$

is applied to the received signal $V_n$ for each the of the first to nth sensors 34 to obtain the display value $Y_n$ for the first to nth field 54.

Since the operator might select another value for the size of the desired bale, step 116 is performed, such that step 110 follows again when no new bale size was selected, and otherwise step 102 is executed again.

The baler 10 starts wrapping the bale 32 with a twine or sheet, indicates to the tractor or operator to stop driving and after wrapping the bale 32 opening the rear housing half 20 or gate to eject the bale when a selected bale size has been reached. In the described embodiment, the control unit 50 can derive the actual bale size from the raw sensor signals before calibration (since the information on the absolute bale size is lost in the calibrated, normalized display values), or from another suitable bale size sensor (not shown).

In a further embodiment, the control unit 50 calibrates the sensors 34 according to a method in which the rods 36 are manually held against a lower stop 58 and an upper stop 60 by the operator while the baling chamber 24 is empty, while informing the control unit 50 about the actual position of the sensors 34, for example by depressing assigned keys on a suitable remote control connected by a wire or wireless (e.g. radio or infrared) to the control unit 50 after a calibration menu was selected. The signals from the sensors 34 obtained during this calibration procedure are used by the control unit 50 to calibrate the sensor values, allowing also to derive calibrated absolute bale size values for controlling the bale wrapping means and the rear housing half 20. In this embodiment, the display 52 can show the bale sizes in absolute or relative units.

Having described the preferred embodiment, it will become apparent that various modifications can be made without departing from the scope of the invention as defined in the accompanying claims.

The invention claimed is:

1. A baler comprising a baling chamber and a sensor arrangement with at least one sensor arranged to provide information about a mechanical property of a bale built in the baling chamber and a control unit receiving signals from the sensor, wherein the control unit automatically calibrates the signals from the sensor by applying at least one of an offset and a conversion factor that is based upon at least one signal from the sensor received in at least one known state of the sensor, and wherein the control unit derives the known state of the sensor from the signals of the sensor received over at least one baling cycle.

2. A baler according to claim 1, wherein the baler is a rotary baler.

3. A baler according to claim 2, wherein the baling chamber has a variable size.

4. A baler according to claim 1, wherein the mechanical property of the bale detected by the sensor is one of a diameter, a length, shape, eccentricity and a deformability of the bale.

5. A baler according to claim 1, wherein the sensor interacts in one of a mechanical and contactless manner with one of the bale and a conveying element surrounding the bale.

6. A baler according to claim 1, wherein one known state of the sensor is an empty baling chamber and the control unit derives the offset value from the signal of the sensor while the baler is empty.

7. A baler according to claim 6, wherein the control unit detects the empty baling chamber based upon a minimum value of the sensor signal.

8. A baler according to claim 1, wherein one known state of the sensor is a filled baling chamber and the control unit derives the conversion factor from the signal of the sensor while the baling chamber is filled.

9. A baler according to claim 8, wherein the control unit detects the filled baling chamber based upon a maximum value of the sensor signal.

10. A baler according to claim 1, wherein the sensor arrangement comprises at least two sensors distributed over the width of the baling chamber, and the control unit provides an output value regarding the shape of the bale.

11. A baler according to claim 8, wherein the control unit uses the conversion factor derived from the sensor providing a larger maximum value for all sensors.

12. A baler according to claim 1, wherein the sensor mechanically interacts with one of the bale and a conveying element abutting the bale, and that one or more stops are provided against which the sensor can be held, the control unit deriving calibration values from the sensor signals obtained when the sensor is held against the one or more stops.

* * * * *